| United States Patent [19] | [11] Patent Number: 4,532,314 |
|---|---|
| Maier | [45] Date of Patent: Jul. 30, 1985 |

[54] METHOD OF SUSPENSION POLYMERIZATION OF VINYL CHLORIDE UTILIZING HYDROXYPROPYL GUAR

[75] Inventor: Helmut K. Maier, Golden Valley, Minn.

[73] Assignee: Henkel Corporation, Minneapolis, Minn.

[21] Appl. No.: 470,512

[22] Filed: Feb. 28, 1983

[51] Int. Cl.³ .................................................. C08F 2/20
[52] U.S. Cl. ...................................... 526/200; 526/202
[58] Field of Search .......................................... 526/200

[56] References Cited

U.S. PATENT DOCUMENTS

| 3,966,696 | 6/1976 | Kidoh | 526/199 |
| 4,145,499 | 3/1979 | Nagano | 526/201 |
| 4,208,499 | 6/1980 | Maruhashi | 526/202 |
| 4,243,562 | 1/1981 | Petit | 526/344.2 |

FOREIGN PATENT DOCUMENTS

| 773737 | 5/1957 | United Kingdom | 526/200 |
| 1541386 | 2/1979 | United Kingdom | 526/202 |

OTHER PUBLICATIONS

European Patent Office; 057,913, Published 8/18/82.

*Primary Examiner*—Christopher A. Henderson
*Attorney, Agent, or Firm*—Ernest E. Szoke; Patrick J. Span

[57] ABSTRACT

A method of preparing polyvinyl chloride via the suspension polymerization method which includes utilizing an effective amount of hydroxypropyl guar as the suspending agent.

7 Claims, No Drawings

METHOD OF SUSPENSION POLYMERIZATION OF VINYL CHLORIDE UTILIZING HYDROXYPROPYL GUAR

BACKGROUND OF THE INVENTION

The present invention relates generally to the manufacture of synthetic polymers, and more particularly, to an improved method of manufacturing polyvinyl chloride (PVC) via the suspension polymerization of vinyl chloride or mixtures of vinyl chloride and other monomers which are copolymerizable therewith.

In the manufacture of polyvinyl chloride through suspension polymerization techniques, vinyl chloride monomer or mixtures of vinyl chloride and other monomers copolymerizable therewith are combined with a suspending agent and various othe known additives in a polymerization reactor under pressure. The reaction is then allowed to continue for a period of time until the desired degree of polymerization has occurred. It has been found that the suspending agent, various additives to the reaction and the various reaction variables including the temperature at which the reaction is carried out, can all affect not only the reaction itself but also the properties of the resulting polyvinyl chloride including uniformity of particle size, narrowness of particle size distribution and the ability to absorb plasticizer.

For the last decade, nonionic cellulose derivitives such as methylhydroxypropyl cellulose (MHPC) and polyvinyl alcohol (PVA) products, along with various other dispersing agents have been used as suspending agents for vinyl chloride polymerization. Both of the above product types have disadvantages that prevent their use over the full temperature range of PVC production. Because cellulose derivatives are not soluble in hot water higher than about 60°-65° C., use of cellulosics are limited at high temperatures. Thus as the temperature of the polymerization reaction approaches these temperatures, precipitation of cellulose derivatives becomes an increasing problem. This is a particular disadvantage since many of the more rigid PVC's are made at temperatures of about 70° C. and higher. The polyvinyl alcohols are soluble at the higher temperatures mentioned above, but by themselves do not give fully acceptable porosity properties. During the last couple of years, polyvinyl alcohol has been combined with a secondary suspending agent such as partially hydrolyzed polyvinyl acetate to improve porosity of the resulting PVC. These secondary suspending agents, however, are quite expensive, thus increasing the overall cost of the PVC production.

Accordingly, the manufacture of PVC by the suspension polymerization method requires at least two different suspending agents, depending upon the temperature at which the polymerization is carried out. This requires maintaining a supply of at least two different suspending agents and in some cases, requires different sizes or types of reactors, depending upon the suspending agent used. As a result, there is a need for an improved method of manufacturing PVC using the suspension polymerization method which can be carried out using a single suspending agent regardless of the temperature of the reaction.

SUMMARY OF THE INVENTION

In accordance with the present invention, a method of manufacturing PVC using the suspension polymerization method has been developed which utilizes a single suspending agent, either by itself or in combination with other secondary suspending agents which can be used over the entire range of reaction temperatures. The present invention contemplates the use of a depolymerized guar derivative as a suspending agent, and more particularly, depolymerized, hydroxypropyl guar. These hydroxypropyl guar samples were found to be stable at all temperatures involved and fully soluble over the entire temperature range. Thus, hydroxypropyl guar does not have a floc point at higher temperatures as is the case with cellulose derivative suspending agents. The hydroxypropyl guar samples also appeared to provide good quality polyvinyl chloride at low temperatures. In addition to the advantage of being usable over the entire temperature range of polymerization reactions, it has a further advantage in that guar in a natural product. Thus, it is always growing and has a more stable and certain long term supply. This may not be the case with many of the presently used suspending agents.

Accordingly, it is an object of the present invention to provide an improved method of manufacturing polyvinyl chloride by the suspension polymerization method.

A further object of the present invention is to provide a method of manufacturing polyvinyl chloride via the suspension polymerization method using a suspending agent which is applicable over the entire range of polymerization temperatures.

Another object of the present invention is to provide an improved method of manufacturing polyvinyl chloride via the suspension polymerization method in which the suspending agent is a depolymerized guar derivative, namely, hydroxypropyl guar.

Another object of the present invention is to provide an improved suspending agent for use in the suspension polymerization of vinyl chloride which is effective throughout the entire range of polymerization temperatures.

These and other objects of the present invention will become apparent with reference to the description of the preferred method and the appended claims.

DESCRIPTION OF THE PREFERRED METHOD

In the commercial manufacture of polyvinyl chloride via the suspension polymerization method, vinyl chloride monomer, water, initiator, buffer, suspending agent and various other possible additives are introduced into a polymerization reaction vessel under pressure. The polymerization reaction is then allowed to continue at a chosen temperature over a period of time (from one or two hours or less to several hours or more) until the desired degree of polymerization is obtained. Although most of the system additives and processing variables can all affect not only the polymerization reaction itself but also the product produced, the choice of suspending agent is probably most important. The suspending agent can affect not only the manner and efficiency with which the polymerization reaction proceeds, but also the characteristics and properties of the polyvinyl chloride product produced. For example, the average particle size, the particle size distribution, the porosity, the bulk density and various other properties of the resulting PVC are significantly affected by the choice of suspending agent. In the past, it was well known to employ a wide variety of suspending agents including organic materials such as gelatins, pectins, etc., cellulose derivatives such as cellulose ether including methyl cellulose and methylhydroxypropyl cellulose, and various forms of polyvinyl alcohol. The present invention contemplates the use of a depolymerized guar derivative as the suspending agent in the suspension polymerization method of producing polyvinyl chloride.

In practicing the present invention the vinyl chloride monomer utilized can be any vinyl chloride monomer conventionally used in the production of polyvinyl chloride. It is also contemplated that the present invention is not only applicable to the suspension polymerization of vinyl chloride but also to the suspension copolymerization of vinyl chloride and varius other ethylenically unsaturated monomers. These can include, among others, ethylene, propylene or other olefins; vinyl acetate or other vinyl esters; vinyl ethers such as lauryl vinyl ether and various acrylates and methacrylates. In the suspension reaction, it is contemplated that the weight ratio of water to total monomer or comonomer should be generally about 65% water and 35% monomer, although various other ratios are also acceptable.

The initiator and the buffer in the suspension polymerization method contemplated by the present invention can be similar to those used in conventional suspension polymerization procedures. The function of the initiator is to start the reaction and to regulate the generation of heat by controlling the rate of the exothermic polymerization reaction. Many different kinds of initiators can be utilized such as lauroyl peroxide, a standard initiator in the polymerization of vinyl chloride. The amount of lauroyl peroxide commonly used is about 0.5% by weight of vinyl chloride monomer. This amount can be varied to change the rate of the reaction. The buffer is used to neutralize any HCl liberated during reaction. In the method performed in this test, sodium bicarbonate was used as a buffer in an approximate amount of 0.5-1.0% by weight of monomer. However, other compounds will work as well and the use level of base in the reaction may vary depending on reactor type, process condition and desired pH of the polymerization system.

The polymerization reaction times and temperatures contemplated by the present invention are similar to conventional suspension polymerization reactions. The temperature at which the suspension polymerization reaction of the present invention is carried out can range from about 45° C. to 80° C. but preferably is about 55° C. to about 70° C., depending upon the particular properties of the polyvinyl chloride desired. The reaction time can also vary quite extensively depending primarily upon the temperature at which the reaction is carried out, the type and amount of initiator used, the desired properties of the resulting polyvinyl chloride and the degree of polymerization desired. Normally the reaction times will vary from about one to three hours at 70° C. to about eight and a half hours at 55° C.

The suspending agent contemplated by the present invention comprises a depolymerized guar derivative and more particularly, a highly substituted, depolymerized, hydroxypropyl guar material. It has been found that such a material, when used as a suspending agent in the suspension polymerization of vinyl chloride is fully functional and compares favorably to suspending agents presently used. Such material has definite advantages over many previously used suspending agents in that it does not precipitate or flocculate at increased reaction temperatures. This allows the hydroxypropyl guar suspending agent to be used over the entire range of polymerization temperatures without loss of suspending activity.

In the preferred procedure, the guar derivatives contemplated for use as suspending agents are depolymerized, hydroxypropyl guar samples. While hydroxypropyl guar samples of various molecular weights will function satisfactorily, the sample should be sufficiently depolymerized to result in a viscosity of less than about 1000 centipoise (cps) in a 2% solution when measured at 20° C. with a Brookfield viscometer at 20 rpm's and preferably less than about 400 cps. It has been found that hydroxypropyl guar samples with varying molar substitution values will function satisfactorily as a suspending agent in the manufacture of polyvinyl chloride. Generally, however, the higher the molar substitution, the better the results. It is believed that the molar substitution should preferably be at least about 0.6.

In preparing the depolymerized, hydroxypropyl guar sample used in the present invention, a quantity of a conventionally available guar powder such as GALACTASOL ® 245 and GALAXY ® 1083, both supplied by Henkel Corporation is combined with a suitable quantity of water and a base such as sodium hydroxide (NaOH). The function of the NaOH is to open up the guar polymer structure, thus allowing water to penetrate, and to convert the hydroxyl groups (OH—) in the guar polymer to the alcoholate, thus preparing these sites for reaction. In general, any base which is strong enough to perform the above conversion will work. Following preparation of the reaction sites as described above, the resulting product is combined with an effective quantity of propylene oxide. The propylene oxide reacts with the prepared sites to produce the hydroxypropyl guar sample. The molar substitution (m.s.) of the resulting product will depend on several factors including the amount of NaOH or other base used to prepare the reaction sites, the amount of guar starting material, the amount of propylene oxide and the temperature used. The molar substitution of the resulting product is normally determined through an analytical procedure known in the art.

Use of depolymerized, hydroxypropyl guar was shown to be functional as a suspending agent in the suspension polymerization of vinyl chloride by conducting comparative tests under laboratory conditions using different suspending agents including various formulations of depolymerized, hydroxypropyl guar contemplated by the present invention as well as nonionic cellulose derivatives and polyvinyl alcohol products of the prior art. These tests were carried out at different reaction temperatures and other reaction conditions. In these comparison tests, three hydroxypropyl guar samples having molar substitution (m.s.) values of 1.1, 1.6 and 2.6 (identified as HPG 1.1, HPG 1.6 and HPG 2.6, respectively) were used. These samples were prepared in accordance with the following procedure.

PREPARATION OF HPG 1.1

400 grams of a guar powder with a solution viscosity of 220 centipoise (cps) at 2% and 25° C. was placed in a 1.5 liter jacketed Abbe reactor. The particular guar product used was GALACTASOL ® 245 Gum manufactured by Henkel Corporation. A solution of 12 grams of sodium hydroxide (NaOH) in 300 grams of water was then added to the guar powder and the mixture was agitated for 30 minutes. The reactor was then sealed, evacuated and flushed with nitrogen three times and evacuated again. 244 grams (4.2 moles) of propylene oxide was then added to the reactor and the reaction mixture heated to 60° C. The inside pressure increased to 20 pounds per square inch (psi) and after a total reaction time of 3 hours and 40 minutes the pressure dropped again. At this point the reactor was cooled to 35° C. and opened. The crude reaction product was washed several times with 80% aqueous acetone, neutralized with HCl, washed again, filtered and dried. The dry material was then ground through a 50 mesh screen to yield 281 grams of hydroxypropyl guar with the following properties:

| | |
|---|---|
| Viscosity (2%, 20° C.) | 52 cps |
| pH (2%, 20° C.) | 4.2 |
| Ash | 3.3% |
| Molar Substitution | 1.1 |
| Surface Tension (1%, 25° C.) | 52.6 dyne/cm |
| Interfacial Tension (1%, vs. TCE, 25° C.) | 31.8 dyne/cm |

PREPARATION OF HPG 1.6

In the same reaction equipment as in the preparation of HPG 1.1 described above, a solution of 20 grams of NaOH in 375 grams of water was added to 500 grams of a low viscosity guar gum. The particular guar material used was GALAXY ® 1083 guar gum supplied by Henkel Corporation. This material had a 2% solution viscosity of 114 cps at 20° C. The mixture was agitated and the reactor closed and flushed with nitrogen as in the HPG 1.1 example above. 725 grams (12.5 moles) of propylene oxide was then added to the evacuated reactor, after which the system was heated to an internal temperature of 62° C., thus increasing the pressure to 19 psi. When the pressure started to drop, the reactor was cooled and opened. The crude reaction mass was agitated with a solution of 0.5 moles of oxalic acid in 500 ml of acetone to neutralize the product. Propylene glycols were removed by washing with acetone and the product was then dried and ground through 20 mesh. The product was then glyoxalated to allow removal of salt by washing with water or an aqueous solvent. A slurry of 300 grams of the reaction product, 14.8 grams of oxalic acid and 72.2 grams of 40% aqueous glyoxal in 1,000 ml of acetone was agitated under a vacuum to dryness. The dry product was heated in an oven at 60° C. for four hours and then washed several times with water and acetone to yield 214 grams of hydroxypropyl guar after filtration, drying and grinding. The resulting hydroxypropyl guar had the following properties:

| | |
|---|---|
| Viscosity (2%, 20° C.) | 107 cps |
| Ash | 0.34% |
| Molar Substitution | 1.6 |
| Surface tension (1%, 25° C.) | 47 dyne/cm |
| Interfacial Tension (1% vs TCE, 25° C.) | 9.4 dyne/cm |

PREPARATION OF HPG 2.6

In essentially the same manner as described in the preparation of HPG 1.6 above, a hydroxypropyl guar product was prepared by reacting 1,450 grams of propylene oxide with 500 grams of a guar gum and 20 grams of NaOH in 375 grams of water. The specific guar gum utilized was GALAXY ® 1083 supplied by Henkel Corporation. The resulting product was then neutralized, washed, dried and ground as described above. Glyoxalation of this product was then carried out by treating 500 grams of the crude product with 20 grams of oxalic acid and 30 grams of 40% aqueous glyoxal in 1,500 ml of acetone as in the preparation of HPG 1.6 above to yield 336 grams of hydroxypropyl guar having the following properties:

| | |
|---|---|
| Viscosity (2%, 20° C.) | 52 cps |
| Ash | 0.64% |
| Molar Substitution | 2.6 |
| Surface Tension (1%, 25° C.) | 48.2 dyne/cm |
| Interfacial Tension (1% vs TCE, 25° C.) | 9.5 dyne/cm |

Following preparation of the hydroxypropyl guar samples (HPG 1.1, HPG 1.6 and HPG 2.6) as described above, comparative tests were conducted using these three samples as suspending agents in the suspension polymerization of vinyl chloride. Similar tests were conducted using two methyl hydroxypropyl cellulose products and two polyvinyl alcohol products as suspending agents. In these comparative tests, the following suspending agents were used:

HPG 1.1 (prepared as described above)
HPG 1.6 (prepared as described above)
HPG 2.6 (prepared as described above)
METOLOSE 60SH50, a methyl hydroxypropyl cellulose product supplied by Shin-Etsu Corporation of Japan
METHOCEL K-100, a methyl hydroxypropyl cellulose product supplied by Dow Chemical Corporation of Midland, Michigan
ALCOTEX 72.5, a polyvinyl alcohol product supplied by Revertex Ltd. of Great Britian
M-05/265, a polyvinyl alcohol product supplied by Perry Chemical Corporation of Elmhurst, New York Each of the above-identified materials was used as a suspending agent in a laboratory suspension polymerization procedure intended to simulate the commercial procedure of manufacturing polyvinyl chloride via the suspension method of polymerization. Following some preliminary tests to determine appropriate levels of suspending agent with respect to the weight of the monomer, etc., runs were conducted at a relatively low polymerization temperature (55° C.) and at a relatively high polymerization temperature (70° C.). The level of suspending agent (S.A.) was also varied between 0.3% and 0.8% by weight of vinyl chloride monomer. The laboratory procedure involved polymerizing the vinyl chloride monomer in the presence of the suspending agent in a capped 200 ml Coke bottle in a temperature controlled water bath inwhich the bottles were shaken lengthwise. In these tests, the shaker rate of the reaction vessel was 134 revolutions per minute and the stroke length was 8.5 inches. Approximately 36% of the bottle volume was occupied. The reaction was allowed to continue for periods of 8½, 6 and 2½ hours, depending upon conditions. Upon completion of the reaction, resulting polyvinyl chloride product was evaluated and data developed with respect to average particle size in microns, particle size distribution in terms of precentage of particles between 88 and 425 microns and percent of plasticizer absorption. A summary of these results are set forth below:

| Temp (°C.) | Suspending Agent | S.A. Level | Average Size | % Part. Size Distribution | % Plast. Absorb. |
| --- | --- | --- | --- | --- | --- |
| 55° | HPG 2.6 | 0.3% | 1480 | 31 | 23.7 |
| 55° | HPG 1.6 | 0.3% | 1518 | 15 | 26.7 |
| 55° | HPG 1.1 | 0.3% | 1970 | 9 | 26.1 |
| 55° | Metolose | 0.3% | 904 | 20 | 35.1 |
| 55° | HPG 2.6 | 0.8% | 241 | 91 | 9.5 |
| 55° | HPG 1.6 | 0.8% | 213 | 79 | 8.4 |
| 55° | HPG 1.1 | 0.8% | 795 | 41 | 23.9 |
| 55° | Metolose | 0.8% | 315 | 55 | 34.6 |
| 55° | Methocel | 0.8% | 297 | 44 | 25.7 |
| 55° | Alcotex | 0.8% | 120 | 43 | 39.2 |
| 55° | M 05/265 | 0.8% | 261 | 31 | 36.3 |
| 70° | HPG 2.6 | 0.3% | 284 | 95 | 6.8 |
| 70° | HPG 1.6 | 0.3% | 1006 | 47 | 8.7 |
| 70° | HPG 1.1 | 0.3% | 1397 | 3 | 12.6 |
| 70° | Metolose | 0.3% | 622 | 48 | 10.8 |
| 70° | Methocel | 0.3% | 1026 | 22 | 14.0 |
| 70° | Alcotex | 0.3% | 835 | 32 | 14.4 |
| 70° | M 05/265 | 0.3% | 607 | 37 | 14.8 |
| 70° | HPG 2.6 | 0.8% | 217 | 96 | 7.6 |
| 70° | HPG 1.6 | 0.8% | 1124 | 14 | 12.6 |
| 70° | HPG 1.1 | 0.8% | 1452 | 5 | 12.4 |
| 70° | Metolose | 0.8% | 298 | 84 | 13.9 |
| 70° | Methocel | 0.8% | 475 | 74 | 8.9 |
| 70° | Alcotex | 0.8% | 154 | 61 | 16.4 |
| 70° | M 05/265 | 0.8% | 140 | 53 | 18.6 |

Based upon the above results, all three of the hydroxypropyl guar samples were shown to be functional as suspending agents in the suspension polymerization of vinyl chloride. At lower temperatures the HPG 1.6 and the HPG 2.6 exhibited superior particle size distribution with 91% and 79%, respectively, of all particles falling within the range of 88 to 425 microns. This was superior to conventional suspending agents. The cellulose and polyvinyl alcohols, when used as the suspending agents, produced, in some cases, similar or smaller average particle size of polyvinyl chloride, but generated too much coarse or fine material under the conditions employed. Thus, the particle size distribution was inferior to that of the HPG 2.6 and HPG 1.6 at 55° C. At the higher temperature of 70° C., the HPG 2.6 exhibited good particle size distribution. Increased molar substitution levels of hydroxypropyl guar appeared to provide better results at higher reaction temperatures.

The plasticizer absorption of the resulting polyvinyl chloride in the above comparative tests indicated that at low temperatures, conventional commercial suspending agents are significantly better than any of the hydroxypropyl guar samples. However, at higher temperatures, the differences are quite small between the hydroxypropyl guar samples and the conventionally used suspending agents. It is believed that a blend of the hydroxypropyl guar with other primary or secondary suspending agents will result in improved plasticizer absorption where needed or desirable. These other suspending agents can include cellulose derivatives, polyvinylalcohol, partially hydrolyzed polyvinyl acetates and polyvinylpyrrolidones as well as possible others.

Although the description of the preferred method of the present invention has been quite specific, it is contemplated that various changes and modifications could be made without deviating from the spirit of the present invention. Accordingly, it is intended that the scope of the present invention be dictated by the appended claims rather than by the description of the preferred method.

I claim:

1. In a method of suspension polymerization of vinyl chloride or vinyl chloride and other monomers copolymerizable therewith, the improvement comprising employing an effective amount of hydroxypropyl guar as a suspending agent wherein said hydroxypropyl guar has a molar substitution of at least 0.6.

2. The method of claim 1 wherein said hydroxypropyl guar has a viscosity (2%, 20° C.) of less than 1,000 cps.

3. The method of claim 2 wherein said hydroxypropyl guar is depolymerized, hydroxypropyl guar having a viscosity (2%, 20° C.) of less than 400 cps.

4. The method of claim 1 wherein said hydroxypropyl guar has a molar substitution of between about 0.6 and 5.

5. The method of claim 4 wherein said hydroxypropyl guar has a viscosity (2%, 20° C.) of less than 1000 cps.

6. The method of claim 1 wherein said hydroxypropyl guar is employed at the rate of less than about 1% by weight of monomer.

7. The method of claim 1 wherein said suspension polymerization is carried out at a temperature of between about 45° C. and 80° C.

* * * * *